(12) United States Patent
    Gorelik

(10) Patent No.: US 8,060,752 B2
(45) Date of Patent: Nov. 15, 2011

(54) TWISTED SIGNATURE

(76) Inventor: Victor Gorelik, Brooklyn, NY (US)

( * ) Notice: Subject to any disclaimer, the term of this patent is extended or adjusted under 35 U.S.C. 154(b) by 2344 days.

(21) Appl. No.: 10/725,116

(22) Filed: Dec. 2, 2003

(65) Prior Publication Data

US 2005/0120228 A1     Jun. 2, 2005

(51) Int. Cl.
    *G06F 21/00*     (2006.01)
(52) U.S. Cl. ............... 713/186; 726/4; 726/17; 726/27; 380/59; 340/5.52; 340/5.82; 382/115
(58) Field of Classification Search .................. 713/186
    See application file for complete search history.

(56) References Cited

U.S. PATENT DOCUMENTS

| | | | | |
|---|---|---|---|---|
| 6,185,316 | B1* | 2/2001 | Buffam | 382/115 |
| 6,272,631 | B1* | 8/2001 | Thomlinson et al. | 713/155 |
| 6,317,834 | B1* | 11/2001 | Gennaro et al. | 713/186 |
| 6,542,608 | B2* | 4/2003 | Scheidt et al. | 380/44 |

* cited by examiner

*Primary Examiner* — Nasser Moazzami
*Assistant Examiner* — Oscar Louie

(57) ABSTRACT

Sampling and transforming ("twisting") of biometric data are performed at client based on information known at client only. Twisting includes shuffling the arrays of biometric data and may include changing of values in these arrays. Twisted biometric data are submitted to server. Amount of information contained in twisted data is enough to verify and/or identify the client using proposed correlation procedure, however, is not enough to restore the client's real biometrical data in case of interception of submitted data and in case of compromising security of server. As a result the privacy of the client is guaranteed in the highest degree.

2 Claims, 2 Drawing Sheets

TWISTED SIGNATURE

CROSS-REFFERENCE TO RELATED APPLICATIONS

Not applicable.

STATEMENT REGARDING FEDERALLY SPONSORED RESEARCH AND DEVELOPMENT

Not applicable.

REFFERENCE TO SEQUENCE LISTING, A TABLE, OR A COMPUTER PROGRAMM LISTING COMPACT DISC APPENDIX

Not applicable.

BACKGROUND OF THE INVENTION

The present invention relates to systems, methods and computer program products for secure client-server communication, and more specifically to systems, methods and computer program products that use biometric data to identify and/or verify an individual.

Electronic communication over public networks, such as the Internet, presents two interrelated problems: the security of the server and the privacy of the client. The security of the server dictates strict requirements for verifying the identity of a client including the use of the client's biometrical information.

Storing biometrical information in server databases in an unencrypted form is dangerous for both server and client. An unauthorized user can intercept a request of an authorized user and use the obtained information to access this particular server, or take advantage of the stolen private information in other ways.

There is a known solution (Biometric authentication system with encrypted models, Gennaro, et al. U.S. Pat. No. 6,317,834 November, 2001), which consists of acquiring a biometric sample and storing an encrypted biometric record in a database. This solution solves the problem of server security, because encryption mechanism prevents an unauthorized user from decrypting of information and from accessing the server-specific information. The privacy of the client could still be compromised, for example, at the stage of transmitting of biometrical samples from client to server during enrollment.

To solve this problem, another known solution may be deployed. (Protection of biometric data via key-dependent sampling, Matyas, Jr., et al. U.S. Pat. No. 6,507,912 January, 2003) According to this solution, the sampling of biometric characteristic is performed on the client side, using the key transmitted from the server to the client. The key-dependent biometric data samples are then transmitted from the client to the server even without the need for additional encryption. The authentication can be done by comparing of key-dependent samples collected during the enrollment process against key-dependent data submitted during the authentication request.

The theoretical basis for this solution is one-way functions. It is safe for the client to submit key-dependent biometric password if there is no way to invert the employed transformation. However, as mentioned in *Fuzzy Extractors and Cryptography, or How to Use Your Fingerprints* (Dodis, et al. http://eprint.iacr.orp/2003/235.pdf) the definition of a one-way function assumes that submitted password is truly uniform, and does not guarantee anything otherwise (and in the case of biometric password, it is far from the truly uniform).

Even if this theoretical obstacle were not an issue, there still would be a serious psychological and, probably, legal problem. An average user does not trust an on-line application 100%, if he/she does not have some element of encryption under his/her own control. Applying a server-generated key to biometrical data does not look so safe to the user as applying some secret word, created on the client side so that the client only knows this word. The publication mentioned above shows that the intuitive fear of the client has a mathematical basis.

BRIEF SUMMARY OF THE INVENTION

It is therefore an object of the present invention to provide improved biometric identification and/or verification systems, methods and computer program products that need not use a server-generated key but instead (or additionally) transform biometric data at client using information known at client only.

This object is provided, according to the present invention, by performing sampling of biometric data at the client and transforming this data at client using information known at client-only (creating "twisted signatures").

During enrollment process the samples of twisted signatures are transmitted to server and stored at server. Real signatures are not stored anywhere and are never transmitted anywhere.

During the following authentication requests the same operations are performed at client: obtaining real signature, transforming it into twisted signature by the same rules as it was done during enrollment, submitting twisted signature to server.

The essence of the present invention is the procedure applied to twisted signatures on the server side. This procedure allows verifying and/or identifying the client even without knowing the information, which was used on the client side to twist the signatures.

The advantage of the present invention over other known solutions is improved privacy of the client, which is guaranteed explicitly by additional transformations at the client side using some information known at the client only.

DETAILED DESCRIPTION OF THE INVENTION

The present invention will now be described more fully using some specific examples of the implementation. This invention may, however, be embodied in many different forms and should not be construed as limited to the provided examples.

In particular, the present invention may be embodied as systems (apparatus), methods and/or computer program products, or as an embodiment combining software and hardware aspects. It may take the form of a computer program product on a computer-readable storage medium having computer-readable program code means embodied in the medium of any type.

The present invention is valid for different types of biometrical data: voice, fingerprints, retina scan and so on. For the purposes of illustration the handwriting signature is chosen.

FIG. 1 illustrates the process of enrollment.

The first step is to get a real biometric sample on client side. For example, the user signs the Window Form of an on-line application, using the mouse of a desktop computer or pen of a handheld device, see FIG. 1A.

Next step is a client side transformation of real biometric sample into a twisted sample using information only known to the client. For example, the user types his/her secret word (let us say, "VIGOR") into the input box of the Window Form and clicks the button "Twist". As a result, the twisted signature replaces the real signature (see FIG. 1B). The deployed transformations will be explained later in this description.

The next step is submitting the twisted signature to the server. For example, client clicks button "Submit" of the Window Form and this twisted signature is sent to the server.

Figure 1A:
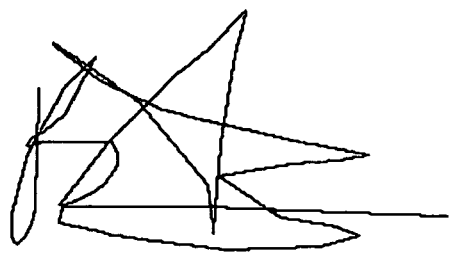
FIG. 1A is a real signature of the client.
Figure 1B:
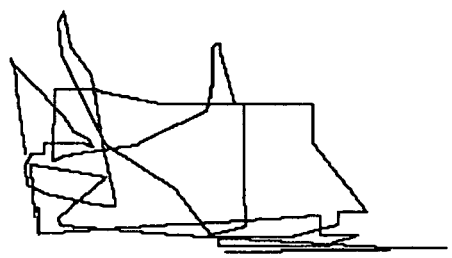
FIG. 1B is a twisted signature generated on the client side using real signature shown on FIG. 1A and information known to client only.
Figure 1C:
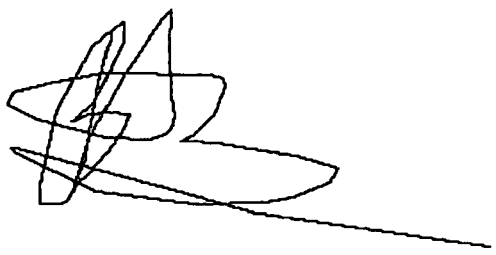
FIG. 1C is another real signature of the client.
Figure 1D:
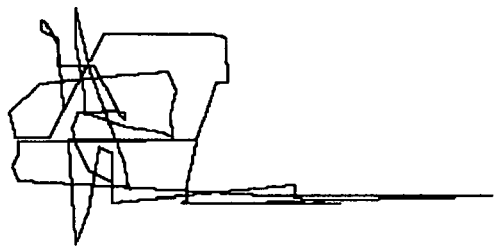
FIG. 1D is a twisted signature generated on the client side using real signature shown on FIG. 1C and information known to client only.

Because the real signature is not absolutely stable, it may be necessary to obtain more real signatures, see FIG. 1C, and save more twisted signature samples on the server, see FIG. 1D.

After finishing the enrollment, the following method can do the verification of the client.

During authentication request client repeats the same operations: signs the Window Form, applies transformation based on the same distortion word ("VIGOR" in our example) and submits the twisted signature to the server. On the server this submitted twisted signature is compared against the samples of twisted signatures of this client stored during enrollment process and/or during previous verifications. The comparison algorithm will be explained later in this description. The result of the comparison is expressed as coefficient between −100% and 100%. If the coefficient is close to 100%, the submitted twisted signature is considered as close enough to the stored samples and the verification is granted.

The identification process is implemented as a comparison of submitted twisted signature against stored samples for each enrolled client. As a result of the identification process the client with the greatest coefficient will be chosen (if this coefficient is close to 100%).

The following is the explanation of how to compare two twisted signatures and how to transform the real signature into the twisted signature.

The real signature can be presented as 3 arrays:

$x_0, x_1, x_2, \ldots, x_{N-1}$,
$y_0, y_1, y_2, \ldots, y_{N-1}$,
$t_0, t_1, t_2, \ldots, t_{N-1}$, where $x_0$ and $y_0$ are coordinates at the moment $t_0, \ldots, x_{N-1}$ and $y_{N-1}$ are coordinates at the moment $t_{N-1}$, and N is number of the mouse moves while signing the Form. For the purposes of illustrating the pace of signing (array $t_0, t_1, t_2, \ldots, t_{N-1}$,) and additional characteristics (like z-pressure as a function of time) are not considered. Only two arrays: x-array and y-array are considered below; they determine the shape of the signature completely. (The other types of biometric data can also be presented as several arrays of numbers and similar procedures are applied.)

To compare two real (not twisted) signatures, the technique of correlation coefficients can be used (Miller at al. *John E. Freud's mathematical statistics*, Prentice Hall, N.J., 1999). $C_x$ is the correlation coefficient between the arrays $x1=\{x1_0, x1_1, x1_2, \ldots, x1_{N-1}\}$,
$x2=\{x2_0, x2_2, x2_2, \ldots, x2_{N-1}\}$, of x-coordinates of first and second real signatures. $C_y$ is the correlation coefficient between arrays $y1=\{y1_0, y1_1, y1_2, \ldots, y1_{N-1}\}$;
$y2=\{y2_0, y2_1, y2_2, \ldots, y2_{N-1}\}$, of y-coordinates of first and second real signatures. If both $C_x$ and $C_y$ are close to 100% (or their average is close to 100%), these two signatures are close.

Calculating of the correlation coefficient between two arrays consists of 3 steps.

Figure 2A:
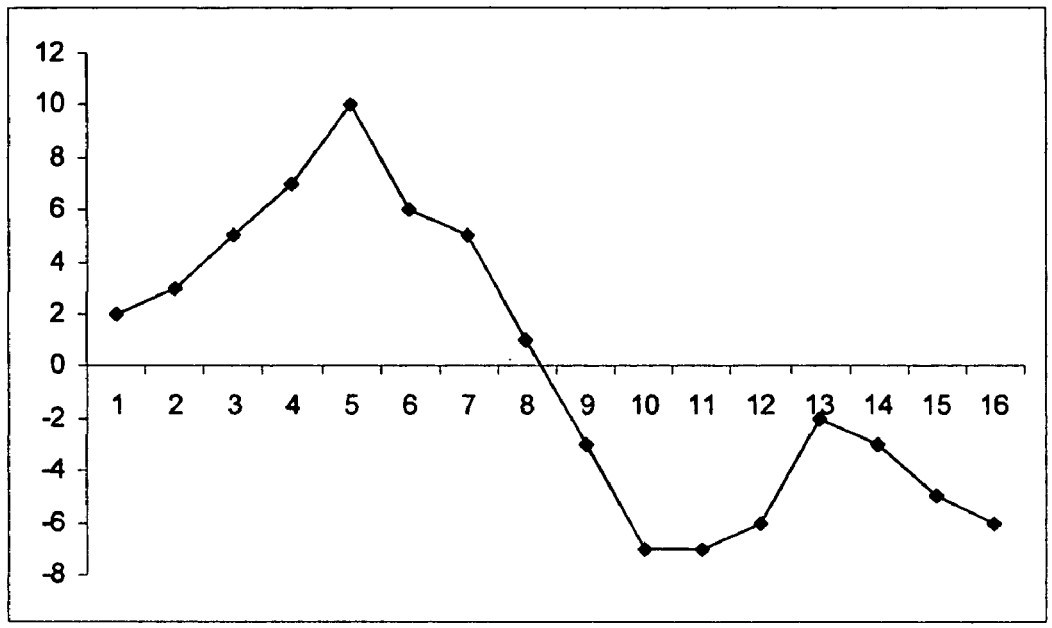
FIG. 2A is the first of the two arrays used for calculation of correlation coefficient.
Figure 2B:
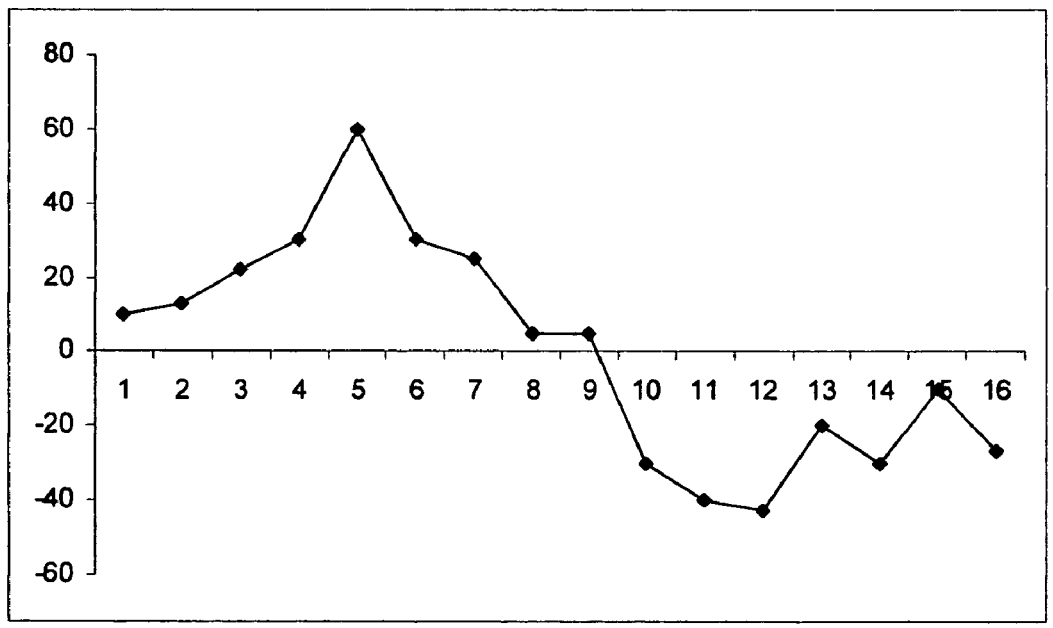
FIG. 2B is the second of the two arrays used for calculation of correlation coefficient.

At the first step, the graphic of each array is shifted in the vertical direction so that the average value of each new array is equal to zero, see FIG. 2. If two original arrays x1 and x2 had exactly the same shape then new arrays x1 (FIG. 2A) and x2 (FIG. 2B) have the following property: if for example $X1_5$ is positive, then $X2_5$ is positive as well, if $X1_9$ is negative then $X2_9$ is negative as well, and so on.

The second step is the calculation of the product $$X1_0 * X2_0 + X1_1 * X2_1 + \ldots + X1_{N-1} * X2_{N-1} \qquad (1)$$

If original arrays x1 and x2 had the same shape, each term in this expression is positive (negative multiplied by negative is positive) and the sum is big. If the arrays had similar shapes most of the terms are positive and the sum is still big.

The third step is normalization. As a result, the correlation coefficient between two arrays of exactly the same shape is equal to 100%; the coefficient between two arrays with opposite shapes (upside down) is equal to −100%; the coefficient between two arrays with very different shapes (between "signal" and "noise") is close to zero.

The important point to notice is that if we shuffle the sequence of the coordinates in the first array x1 and the sequence of the coordinates in the second array x2 in exactly the same way, we do not change the correlation coefficient, because the sum (1) does not depend on the order of the items. That is why twisted (by shuffling) signatures can be used instead of real ones.

The following is an example of the possible ways to twist the signature.

There are N!*N! ways the real signature can be twisted by shuffling the original arrays $\{x_0, x_1, x_2, \ldots, x_{N-1}\}$ and $\{y_0, y_1, y_2, \ldots, y_{N-1}\}$. To choose one of the ways the client uses the secret distortion word ("VIGOR" in our example). Each character in the word has a numerical value, ASCII code, for example. The sum of these values is equal to, let us say, 238. If N is known, let us say, N=100, the value of "shift" 238%100=38 can be calculated.

The original array ($\{x_0, x_1, x_2, \ldots, x_{N-1}\}$ corresponding to the real signature is replaced by the new array: $x_0$ is replaced by $x_{38}$, $x_1$ is replaced by $x_{39}, \ldots, x_{61}$ is replaced by $x_{99}$, $x_{62}$ is replaced by $x_0$, $x_{63}$ is replaced by $x_1$, and so on.

The original array $\{y_0, y_1, y_2, \ldots, y_{N-1},\}$ corresponding to real signature is replaced by the new array using double shift: 74 instead of 38. This way of shuffling creates a twisted signature, each point of which has x-coordinate equal to x-coordinate of one point of the real signature and y-coordinate equal to y-coordinate of another point of the real signature.

If client does not provide a secret world some default for this client sequence may be chosen.

As mentioned before, several samples of twisted signatures of one person may be stored on the server. Table 1 contains correlation coefficients of x and y-arrays for 6 twisted signatures of one person. The first line in each cell of the table corresponds to the x-coefficient; the second line corresponds to the y-coefficient.

TABLE 1

Correlation coefficients between 6 twisted signatures of one person.

| | $1^{st}$ signature | $2^{nd}$ signature | $3^{rd}$ signature | $4^{th}$ signature | $5^{th}$ signature |
|---|---|---|---|---|---|
| $2^{nd}$ signature | 81 | | | | |
| | 86 | | | | |
| $3^{rd}$ signature | 49 | 73 | | | |
| | 77 | 90 | | | |
| $4^{th}$ signature | 84 | 87 | 73 | | |
| | 89 | 93 | 90 | | |
| $5^{th}$ signature | 46 | 64 | 74 | 64 | |
| | 67 | 51 | 37 | 55 | |
| $6^{th}$ signature | 67 | 73 | 88 | 81 | 78 |
| | 79 | 65 | 61 | 71 | 66 |

The correlation coefficients between the corresponding real signatures are absolutely the same.

Table 2 demonstrates the comparison of 6 twisted signatures of one person with twisted signatures of 2 other persons.

TABLE 2

Correlation coefficients between signatures of the different persons.

| | Person 1 | | | | | |
|---|---|---|---|---|---|---|
| | $1^{st}$ signature | $2^{nd}$ signature | $3^{rd}$ signature | $4^{th}$ signature | $5^{th}$ signature | $6^{th}$ signature |
| $1^{st}$ signature of person 2 | 0 | −12 | −28 | −21 | −5 | −12 |
| | 6 | −11 | −15 | −4 | 3 | 23 |
| $1^{st}$ signature of person 3 | 71 | 61 | 41 | 60 | 53 | 48 |
| | 5 | 0 | −1 | −3 | 12 | 24 |

The levels of what "is close to 100%" are established on the base of statistical characteristics of the signatures and on the levels of desired security. In the described example, the level of 70% for average coefficient may be used: if the average of 12 coefficients (6 for x-arrays and 6 for y-arrays) between the submitted twisted signature and 6 stored samples of twisted signatures is greater then 70%, the verification is granted.

The shuffling does not change the values of the items in array. Additional transformations may be applied which do change these values: before or after shuffling of the two arrays x1 and x2 each of them can be multiplied by the same sequence of N numbers. It will change the correlation coefficient, however, if it was close to 100%, it will still be close to 100%, because the shapes of two arrays x1 and x2 were changed synchronously. This additional transformation may be used to regulate statistical characteristics of the input (to make distribution of values uniform, for example) and to make the restoration of the real signature from the twisted one even more difficult.

The described example illustrates how verification and/or identification on server may be done without knowing the secret word created on client, more generally—without knowing parameters of distortion procedure used on client to transform real signature into twisted one. This distortion procedure includes shuffling the arrays of biometric data and may include changing of values in these arrays.

Applying of described distortion procedure is enough to prevent restoring of client's biometric data in case of interception of transmitted data and in case of compromising security of server. As a result privacy of the client is guaranteed in the highest degree. On the other hand the amount of information contained in the twisted signature is enough to verify/identify the client and guarantee security of server.

Another example of the present invention's possible embodiment is a system where server and client are implemented in one device and are not using public network for communication. In this kind of systems server is a subsystem storing twisted samples of biometric data and making decision regarding verification and/or identification of a client. Client is a subsystem collecting biometric data, twisting this data and submitting twisted data to server. For example, teller machines may store twisted fingerprints of the customer, generated based on the real fingerprints and secret code known to the customer only. Server does not know this secret code; person only who submits his/her fingerprints along with this code knows it. After twisted fingerprint is generated on client the secret code and real signature do not need anymore, so they are not stored anywhere. Even in the case of compromising security of server the customer is risking only his twisted fingerprints saved on server. For other applications the customer is using the same real fingerprints along with the different secret code.

In the drawings and specification above, there have been disclosed typical embodiments of the invention and, although specific terms are employed, they are used in a generic and descriptive sense only and not for purposes of limitation.

What I claim as my invention is:

1. A method for securely submitting biometric data from a client to a server comprising the steps of:
    performing sampling of a real biometric characteristic at the client; and
    shuffling arrays of real biometric characteristics in the sequence known at the client only to thereby generate twisted biometric data, wherein the shuffling sequence is calculated at the client on the base of the value of a secret object created at the client and known to the client only, combined with the step of multiplying the arrays of biometric characteristics by the sequences of numbers fixed for each type of array and known at the client only; and
    submitting the twisted biometric data from the client to the server.

2. A method according to claim 1 wherein the step of submitting of twisted biometric data is followed by the step of comparing this data against the samples of twisted biometric data saved at the server previously, in such a way, that the result of the verification and/or identification depends neither on the specific sequence in which biometric arrays were shuffled on the client, nor on the specific sequence of numbers used on the client to change the values of the arrays.

* * * * *